United States Patent
Li et al.

(10) Patent No.: US 12,446,494 B1
(45) Date of Patent: Oct. 21, 2025

(54) BIMODAL BLUE LIGHT FOR PROMOTING PLANT GROWTH TECHNICAL FIELD

(71) Applicant: FUJIAN SANAN SINO-SCIENCE PHOTOBIOTECH CO., LTD., Quanzhou (CN)

(72) Inventors: Yang Li, Quanzhou (CN); Yiqun Chen, Quanzhou (CN); Jian Ma, Quanzhou (CN)

(73) Assignee: FUJIAN SANAN SINO-SCIENCE PHOTOBIOTECH CO., LTD., Quanzhou (CN)

( * ) Notice: Subject to any disclaimer, the term of this patent is extended or adjusted under 35 U.S.C. 154(b) by 120 days.

(21) Appl. No.: 18/267,120

(22) PCT Filed: Jul. 19, 2021

(86) PCT No.: PCT/CN2021/107136
§ 371 (c)(1),
(2) Date: Jun. 14, 2023

(87) PCT Pub. No.: WO2022/142282
PCT Pub. Date: Jul. 7, 2022

(51) Int. Cl.
*A01G 7/04* (2006.01)
(52) U.S. Cl.
CPC .................... *A01G 7/045* (2013.01)

(58) Field of Classification Search
CPC ..... A01G 7/045; A01G 9/249; F21Y 2113/10; F21Y 2113/13; F21Y 2113/17
See application file for complete search history.

(56) References Cited

U.S. PATENT DOCUMENTS

| | | | | |
|---|---|---|---|---|
| 9,410,664 B2* | 8/2016 | Krames | ................. | F21V 9/08 |
| 9,844,518 B2* | 12/2017 | Lowe | ................ | A01G 22/60 |
| 9,915,775 B2* | 3/2018 | Krames | .............. | G02B 6/0073 |
| 10,288,233 B2* | 5/2019 | Jones | ................. | F21K 9/64 |
| 11,073,727 B2* | 7/2021 | David | .............. | G02F 1/133617 |
| 11,596,108 B2* | 3/2023 | Ma | ................. | A01G 7/045 |

OTHER PUBLICATIONS

Zhibin Cai et. al, Synthesis, Characterization and Two-Photon Absorption Properties of Novel Blue UpConverted Fluorescent Molecules, Acta Physico-Chimica Sinica, Jan. 15, 2014, pp. 164-170, vol. 30, No. 01.

* cited by examiner

*Primary Examiner* — Magdalena Topolski
*Assistant Examiner* — Katherine Anne Kloecker
(74) *Attorney, Agent, or Firm* — Jose Cherson Weissbrot

(57) ABSTRACT

The present invention provides a bimodal blue light for promoting plant growth, which has peaks in wavebands of 431-441 nm and 445-455 nm, respectively. The ratio of the number of photons in the waveband of 445-455 nm to the number of photons in the waveband of 431-441 nm is 1.18-1.54. Test shows that using the bimodal blue light of the present invention can promote plant growth and increase yield.

9 Claims, 1 Drawing Sheet

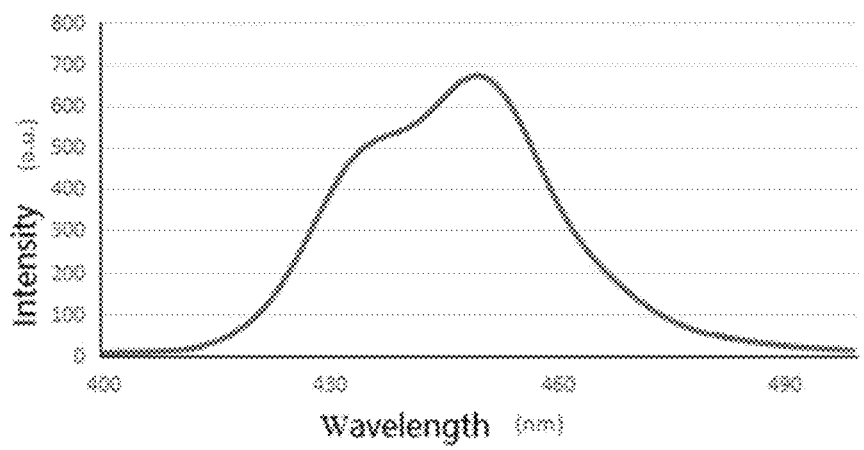

BIMODAL BLUE LIGHT FOR PROMOTING PLANT GROWTH TECHNICAL FIELD

TECHNICAL FIELD

The present invention belongs to the technical field of plant cultivation, and particularly relates to a bimodal blue light for promoting plant growth.

BACKGROUND

During the growth and development of plants, the energy source required mainly derives from photosynthesis. To ensure efficient photosynthesis of plants, suitable light conditions must be provided for plants. Plant growth and development will be regulated according to light characteristics including light time, light intensity, light quality, and the like. Light quality is one of the indispensable environmental conditions in the process of plant growth and development. Many studies have shown that red light and blue light are essential for plant growth. As the requirements of application in the field of plant lighting, LED plant lights that can achieve precise control of light quality have gradually developed. Current plant lights are LED light sources including red and blue lights with a single-wavelength narrow-band spectrum, which may be restricted to some extent. At present, the available wavelength band of blue light is generally 450-470 nm. Current conventional chips are generally 2835 surface mount devices (SMD) package, 5630 SMD package, or 5050 SMD packaging, which only has a single-wavelength output and cannot fully meet the requirements of plants because the optimal wavelengths of blue light required by plants are 440 nm, 460 nm, and 485 nm, respectively.

At present, plant lights available on the market generally have a blue light energy region with a single-wavelength and narrow-band spectrum and are confined, while chlorophyll has multiple absorption peaks in the blue light region, thus the optimal conditions for plant growth cannot be satisfied. Therefore, it is urgent to obtain a blue light with a multi-wavelength and broad-band spectrum more suitable for being adsorbed by plant chlorophyll and the specific energy distribution in a blue light region.

SUMMARY

In view of the deficiencies of the prior art, the technical problem to be solved by the present invention is to provide a bimodal blue light for promoting plant growth. The bimodal blue light spectrum (B436 nm and B450 nm) of the present invention is combined with the light quantum distribution ratio in a specific region (B445-B455 nm/B431-B441 nm) of 1.18-1.54, which promotes plant growth and increases vegetable yield and flowering quantity. Through the spectrum technology of the present invention, plant growth can be promoted with increased yield.

The specific technical solution of the present invention is as follows:

A bimodal blue light for promoting plant growth, including peaks in wavebands of 431-441 nm and 445-455 nm, respectively, where the ratio of the number of photons in the waveband of 445-455 nm to the number of photons in the waveband of 431-441 nm is 1.18-1.54.

Preferably, the peak wavelength in the waveband of 431-441 nm is 436 nm, and the peak wavelength in the waveband of 445-455 nm is 450 nm.

Further, the number of photons in the waveband of 431-441 nm accounts for 21-27% of the total number of photons in the waveband of 400-499 nm.

Further, the number of photons in the waveband of 445-455 nm accounts for 28-37% of the total number of photons in the waveband of 400-499 nm.

Further, the number of photons in the waveband of 400-430 nm accounts for 13-24% of the total number of photons in the waveband of 400-499 nm.

Further, the number of photons in the waveband of 442-444 nm accounts for 8-11% of the total number of photons in the waveband of 400-499 nm.

Further, the number of photons in the waveband of 456-499 nm accounts for 1-2% of the total number of photons in the waveband of 400-499 nm.

The present invention further provides an application of the above-mentioned bimodal blue light for promoting plant growth in plant cultivation.

In the above application, the light intensity of a light source is set as 150-800 $\mu mol/m^2 \cdot s$, and the photoperiod is 8-15 h/d.

The advantage of the present invention is as follows: tests show that using the bimodal blue light of the present invention can promote plant growth and increase yield.

BRIEF DESCRIPTION OF THE DRAWING

FIG. 1 is a diagram showing the light spectrum of the LED light in Embodiment 7.

DETAILED DESCRIPTION OF THE EMBODIMENTS

The present invention will be described in further detail below in conjunction with the embodiments, but the embodiments of the present invention are not limited thereto. Without departing from the technical concepts of the present invention described above, various replacements and changes made according to common technical knowledge and conventional means in the art shall be included within the scope of the present invention.

The embodiments of the present invention provide a bimodal blue light spectrum (B436 nm and B450 nm) combined with the light quantum distribution ratio in a specific region (B445-B455 nm/B431-B441 nm) of 1.18-1.54, which promotes plant growth and increases yield. It is mainly used in the supplementary light system LED plant lighting products in the field of plant lighting, which can promote plant growth and increase yield. The specific use is as follows: Vegetables/flowers are subjected to early seedling raising treatment. The seeds are soaked in clear water and then sown into sponge cubes with one seed per hole, followed by putting in a germination box for germination. After the seeds germinate, the seeds are subjected to seedling raising treatment. During the seedling raising treatment, the nutrient solution has an EC value of 0.8-1.2 mS/cm and a pH of 6.0-7.0. Until the vegetables/flowers grow to have four to five real leaves, they are transplanted on planting plates with a row interval of 15 cm×20 cm for cultivation and placed into a nutrient solution tank for culture. The nutrient solution adopts nutrient film technique. During the whole planting period, the nutrient solution has an EC value controlled between 1.2-2.0 and a pH of 6.0-7.0. The EC value gradually increases with the extending of vegetable/flower growth period. The nutrient solution has a temperature of 20-22° C. and a dissolved oxygen of 5 mg/L-6 mg/L. The ambient temperature is 20-23° C. during the day and 18-20° C. at night. The air humidity is 60-70%. During the planting period, the LED spectrum control method of the present invention is used, that is, dual-wavelength blue light (preferably B436 and B450) is used as the blue light peak light source of the LED spectrum to replace the traditional single-wavelength blue light B450 nm, and the light intensity is set as 150-800 µmol·m$^{-2}$·s$^{-1}$, the photoperiod is 8-15 h/d. After 15-50 days of planting, the vegetables/flowers can be harvested.

The technical solution of the present invention will be described in detailed below with the specific embodiments.

Embodiment 1

Plump elegant lettuce seeds are selected. The elegant lettuce seeds are soaked and then sown into sponge cubes with one seed per hole, followed by putting in a 23° C. germination box for germination. After the seeds germinate, the seeds are transferred to a hydroponic nutrient solution for seedling raising management until four to five real leaves are cultivated. The nutrient solution has an EC value of 0.8-1.2 mS/cm and a pH of 6.0-7.0. Neat and uniform seedlings with four to five real leaves are selected and transplanted on planting plates with a row interval of 15 cm×20 cm and placed into a nutrient solution tank for culture. The nutrient film technique is used. In the first eight days after planting, the nutrient solution has an EC value controlled between 1.2-1.8 mS/cm and a pH of 6.0-7.0. After planting for eight days, the EC value of the nutrient solution is controlled between 1.8-2.0 mS/cm and the pH is 6.0-7.0. The whole planting period lasts twenty days until harvesting. During the whole planting period, the nutrient solution has a temperature controlled at 21° C. and a dissolved oxygen of 5 mg/L-6 mg/L. The ambient temperature is 21° C. during the day and 18° C. at night. The air humidity is 60-70%. After transplanted for planting, an LED lighting treatment is conducted. The light source uses light spectra from five comparative examples and eight embodiments, and the light intensity is set as 300 µmol·m$^{-2}$·s$^{-1}$, the photoperiod is 12 h/d. The elegant lettuce is cultivated according to the above method with light source parameters differing in various embodiments and comparative examples. After planting for twenty days, relevant morphological data of the various embodiments and comparative examples are recorded. The experimental results are shown in Table 1:

TABLE 1

| No. | Proportion of 400-430 nm photons in light source of 400-499 nm (%) | Proportion of 431-441 nm photons in light source of 400-499 nm Proportion | Proportion of 442-444 nm photons in light source of 400-499 nm | Proportion of 445-455 nm photons in light source of 400-499 nm (%) Proportion | Proportion of 456-499 nm photons in light source of 400-499 nm (%) | Energy ratio of 445-455 nm to 431-441 nm |
|---|---|---|---|---|---|---|
| Comparative example 1 | 3.80 | 12.60 | 10.11 | 39.67 | 33.82 | 3.15 |
| Comparative example 2 | 25.04 | 40.75 | 8.68 | 16.99 | 8.54 | 0.42 |
| Comparative example 3 | 23.45 | 38.59 | 8.75 | 17.35 | 11.86 | 0.45 |
| Comparative example 4 | 17.45 | 29.69 | 9.45 | 31.42 | 11.99 | 1.06 |
| Comparative example 5 | 4.42 | 20.86 | 9.87 | 38.38 | 26.47 | 1.84 |
| Embodiment 1 | 15.42 | 24.38 | 8.95 | 28.67 | 22.58 | 1.18 |
| Embodiment 2 | 15.36 | 24.72 | 9.24 | 30.47 | 20.21 | 1.23 |
| Embodiment 3 | 14.87 | 23.04 | 9.65 | 29.26 | 23.18 | 1.27 |
| Embodiment 4 | 13.85 | 21.39 | 10.45 | 32.90 | 21.41 | 1.54 |
| Embodiment 5 | 17.45 | 26.66 | 9.45 | 34.45 | 11.99 | 1.29 |
| Embodiment 6 | 17.45 | 25.02 | 9.45 | 36.09 | 11.99 | 1.44 |
| Embodiment 7 | 23.45 | 25.42 | 8.75 | 30.52 | 11.86 | 1.20 |
| Embodiment 8 | 23.45 | 22.36 | 8.75 | 33.58 | 11.86 | 1.50 |

| No. | Spectral composition and peak characteristics — Peak characteristics | Biological indicators — Plant height/cm | Crown width/cm | Fresh weight per plant/g |
|---|---|---|---|---|
| Comparative example 1 | Single peak 450 | 9.7 | 18.5 | 51.67 |
| Comparative example 2 | Single peak 436 | 10.3 | 19.5 | 53.87 |
| Comparative example 3 | Dual peaks 436, 450 | 10.5 | 20.1 | 53.04 |
| Comparative example 4 | Dual peaks 436, 450 | 11.2 | 20.3 | 55.68 |
| Comparative example 5 | Dual peaks 436, 450 | 11.3 | 20.4 | 54.39 |
| Embodiment 1 | Dual peaks 436, 450 | 11.4 | 21.8 | 60.37 |
| Embodiment 2 | Dual peaks 436, 450 | 11.7 | 22.1 | 61.44 |
| Embodiment 3 | Dual peaks 436, 450 | 11.6 | 21.4 | 62.56 |

TABLE 1-continued

| | | | | |
|---|---|---|---|---|
| Embodiment 4 | Dual peaks 436, 450 | 11.5 | 23.2 | 58.24 |
| Embodiment 5 | Dual peaks 436, 450 | 11.4 | 22.9 | 60.42 |
| Embodiment 6 | Dual peaks 436, 450 | 11.6 | 22 . . . 8 | 61.28 |
| Embodiment 7 | Dual peaks 436, 450 | 11.7 | 22.7 | 59.87 |
| Embodiment 8 | Dual peaks 436, 450 | 11.6 | 23.1 | 60.78 |

The test results show that: compared with the five comparative examples, the elegant lettuce cultivated using the bimodal blue light of Embodiments 1-8 which has the ratio of B445-B455 nm to B431-B441 nm in the range of 1.18-1.54 has significantly higher plant height, crown width, and biomass.

Embodiment 2

Plump White Beauty white stem small cabbage seeds are selected. The White Beauty seeds are soaked and then sown into sponge cubes with one seed per hole, followed by putting in a 23° C. germination box for germination. After the seeds germinate, the seeds are transferred to a hydroponic nutrient solution for seedling raising management until four to five real leaves are cultivated. The nutrient solution has an EC value of 0.8-1.2 mS/cm and a pH of 6.0-7.0. Neat and uniform seedlings with four to five real leaves are selected and transplanted on planting plates with a row interval of 15 cm×20 cm and placed into a nutrient solution tank for culture. The nutrient film technique is used. In the first eight days after planting, the nutrient solution has an EC value controlled between 1.2-1.8 mS/cm and a pH of 6.0-7.0. After planting for eight days, the EC value of the nutrient solution is controlled between 1.8-2.0 mS/cm and the pH is 6.0-7.0. The whole planting period lasts twenty days until harvesting. During the whole planting period, the nutrient solution has a temperature controlled at 21° C. and a dissolved oxygen of 5 mg/L-6 mg/L. The ambient temperature is 21° C. during the day and 18° C. at night. The air humidity is 60-70%. After transplanted for planting, an LED lighting treatment is conducted. The light source uses light spectra from five comparative examples and eight embodiments, and the light intensity is set as 250 $\mu mol \cdot m^{-2} \cdot s^{-1}$, the photoperiod is 13.5 h/d. The White Beauty white stem small cabbage is cultivated according to the above method with light source parameters differing in various embodiments and comparative examples. After planting for sixteen days, relevant morphological data of the various embodiments and comparative examples are recorded. The experimental results are shown in Table 2:

TABLE 2

| | Spectral composition and peak characteristics | | | | | |
|---|---|---|---|---|---|---|
| No. | Proportion of 400-430 nm photons in light source of 400-499 nm (%) | Proportion of 431-441 nm photons in light source of 400-499 nm (%) Proportion | Proportion of 442-444 nm photons in light source of 400-499 nm | Proportion of 445-455 nm photons in light source of 400-499 nm (%) Proportion | Proportion of 456-499 nm photons in light source of 400-499 nm (%) | Energy ratio of 445-455 nm to 431-441 nm |
| Comparative example 1 | 3.80 | 12.60 | 10.11 | 39.67 | 33.82 | 3.15 |
| Comparative example 2 | 25.04 | 40.75 | 8.68 | 16.99 | 8.54 | 0.42 |
| Comparative example 3 | 23.45 | 38.59 | 8.75 | 17.35 | 11.86 | 0.45 |
| Comparative example 4 | 17.45 | 29.69 | 9.45 | 31.42 | 11.99 | 1.06 |
| Comparative example 5 | 4.42 | 20.86 | 9.87 | 38.38 | 26.47 | 1.84 |
| Embodiment 1 | 15.42 | 24.38 | 8.95 | 28.67 | 22.58 | 1.18 |
| Embodiment 2 | 15.36 | 24.72 | 9.24 | 30.47 | 20.21 | 1.23 |
| Embodiment 3 | 14.87 | 23.04 | 9.65 | 29.26 | 23.18 | 1.27 |
| Embodiment 4 | 13.85 | 21.39 | 10.45 | 32.90 | 21.41 | 1.54 |
| Embodiment 5 | 17.45 | 26.66 | 9.45 | 34.45 | 11.99 | 1.29 |
| Embodiment 6 | 17.45 | 25.02 | 9.45 | 36.09 | 11.99 | 1.44 |
| Embodiment 7 | 23.45 | 25.42 | 8.75 | 30.52 | 11.86 | 1.20 |
| Embodiment 8 | 23.45 | 22.36 | 8.75 | 33.58 | 11.86 | 1.50 |

| | Spectral composition and peak characteristics | Biological indicators | | |
|---|---|---|---|---|
| No. | Peak characteristics | Plant height/cm | Crown width/cm | Fresh weight per plant/g |
| Comparative example 1 | Single peak 450 | 17.9 | 20.3 | 74.36 |
| Comparative example 2 | Single peak 436 | 18.8 | 21.6 | 77.59 |
| Comparative example 3 | Dual peaks 436, 450 | 18.6 | 21.8 | 78.67 |

TABLE 2-continued

| | | | | |
|---|---|---|---|---|
| Comparative example 4 | Dual peaks 436, 450 | 19.7 | 22.7 | 80.36 |
| Comparative example 5 | Dual peaks 436, 450 | 18.9 | 21.3 | 79.58 |
| Embodiment 1 | Dual peaks 436, 450 | 20.3 | 22.9 | 84.36 |
| Embodiment 2 | Dual peaks 436, 450 | 20.8 | 23.5 | 86.54 |
| Embodiment 3 | Dual peaks 436, 450 | 20.6 | 23.8 | 87.69 |
| Embodiment 4 | Dual peaks 436, 450 | 19.8 | 22.7 | 85.38 |
| Embodiment 5 | Dual peaks 436, 450 | 20.6 | 22.7 | 83.34 |
| Embodiment 6 | Dual peaks 436, 450 | 20.5 | 23.4 | 84.69 |
| Embodiment 7 | Dual peaks 436, 450 | 20.3 | 22.8 | 84.69 |
| Embodiment 8 | Dual peaks 436, 450 | 20.7 | 23.2 | 85.67 |

The test results show that: compared with the five comparative examples, the White Beauty white stem small cabbage cultivated using the bimodal blue light of Embodiments 1-8 which has the ratio of B445-B455 nm to B431-B441 nm in the range of 1.18-1.54 has significantly higher plant height, crown width, and biomass.

Embodiment 3

Plump pansy seeds are selected. The pansy seeds are soaked and then sown into sponge cubes with one seed per hole, followed by putting in a 23° C. germination box for germination. After the seeds germinate, the seeds are transferred to a hydroponic nutrient solution for seedling raising management until four to five real leaves are cultivated. The nutrient solution has an EC value of 0.8-1.2 mS/cm and a pH of 6.0-7.0. Neat and uniform seedlings with four to five real leaves are selected and transplanted on planting plates with a row interval of 15 cm×20 cm and placed into a nutrient solution tank for culture. The nutrient film technique is used. In the first eight days after planting, the nutrient solution has an EC value controlled between 1.2-1.8 mS/cm and a pH of 6.0-7.0. After planting for eight days, the EC value of the nutrient solution is controlled between 1.8-2.0 mS/cm and the pH is 6.0-7.0. The whole planting period lasts twenty days until harvesting. During the whole planting period, the nutrient solution has a temperature controlled at 21° C. and a dissolved oxygen of 5 mg/L-6 mg/L. The ambient temperature is 21° C. during the day and 18° C. at night. The air humidity is 60-70%. After transplanted for planting, an LED lighting treatment is conducted. The light source uses light spectra from five comparative examples and eight embodiments, and the light intensity is set as 220 μmol·m$^{-2}$·s$^{-1}$, the photoperiod is 12.5 h/d. The pansy is cultivated according to the above method with light source parameters differing in various embodiments and comparative examples. After planting for thirty days, relevant flower data of the various embodiments and comparative examples are recorded. The experimental results are shown in Table 3:

TABLE 3

| | Spectral composition and peak characteristics | | | | | |
|---|---|---|---|---|---|---|
| No. | Proportion of 400-430 nm photons in light source of 400-499 nm (%) | Proportion of 431-441 nm photons in light source of 400-499 nm (%) Proportion | Proportion of 442-444 nm photons in light source of 400-499 nm | Proportion of 445-455 nm photons in light source of 400-499 nm (%) Proportion | Proportion of 456-499 nm photons in light source of 400-499 nm (%) | Energy ratio of 445-455 nm to 431-441 nm |
| Comparative example 1 | 3.80 | 12.60 | 10.11 | 39.67 | 33.82 | 3.15 |
| Comparative example 2 | 25.04 | 40.75 | 8.68 | 16.99 | 8.54 | 0.42 |
| Comparative example 3 | 23.45 | 38.59 | 8.75 | 17.35 | 11.86 | 0.45 |
| Comparative example 4 | 17.45 | 29.69 | 9.45 | 31.42 | 11.99 | 1.06 |
| Comparative example 5 | 4.42 | 20.86 | 9.87 | 38.38 | 26.47 | 1.84 |
| Embodiment 1 | 15.42 | 24.38 | 8.95 | 28.67 | 22.58 | 1.18 |
| Embodiment 2 | 15.36 | 24.72 | 9.24 | 30.47 | 20.21 | 1.23 |
| Embodiment 3 | 14.87 | 23.04 | 9.65 | 29.26 | 23.18 | 1.27 |
| Embodiment 4 | 13.85 | 21.39 | 10.45 | 32.90 | 21.41 | 1.54 |
| Embodiment 5 | 17.45 | 26.66 | 9.45 | 34.45 | 11.99 | 1.29 |
| Embodiment 6 | 17.45 | 25.02 | 9.45 | 36.09 | 11.99 | 1.44 |
| Embodiment 7 | 23.45 | 25.42 | 8.75 | 30.52 | 11.86 | 1.20 |
| Embodiment 8 | 23.45 | 22.36 | 8.75 | 33.58 | 11.86 | 1.50 |

| No. | Spectral composition and peak characteristics Peak characteristics | Biological indicator Flower quantity/plant |
|---|---|---|
| Comparative example 1 | Single peak 450 | 52 |
| Comparative example 2 | Single peak 436 | 56 |

TABLE 3-continued

| | | |
|---|---|---|
| Comparative example 3 | Dual peaks 436, 450 | 53 |
| Comparative example 4 | Dual peaks 436, 450 | 59 |
| Comparative example 5 | Dual peaks 436, 450 | 58 |
| Embodiment 1 | Dual peaks 436, 450 | 65 |
| Embodiment 2 | Dual peaks 436, 450 | 68 |
| Embodiment 3 | Dual peaks 436, 450 | 70 |
| Embodiment 4 | Dual peaks 436, 450 | 62 |
| Embodiment 5 | Dual peaks 436, 450 | 64 |
| Embodiment 6 | Dual peaks 436, 450 | 63 |
| Embodiment 7 | Dual peaks 436, 450 | 65 |
| Embodiment 8 | Dual peaks 436, 450 | 64 |

The test results show that: compared with the five comparative examples, the pansy cultivated using the bimodal blue light of Embodiments 1-8 which has the ratio of B445-B455 nm to B431-B441 nm in the range of 1.18-1.54 has significantly higher flower quantity.

Although the above-mentioned embodiments have been described, those skilled in the art can make additional changes and modifications to these embodiments once they know the basic creative concept, so the above are only the embodiments of the present invention and are not intended to limit the scope of patent protection of the present invention. Any equivalent structure or equivalent process transformation made by using the specification and drawings of the present invention, or directly or indirectly used in other related technical fields, is also included in the scope of patent protection of the present invention.

What is claimed is:

1. A bimodal blue light for promoting plant growth, comprising peaks in wavebands of 431-441 nm and 445-455 nm, respectively, wherein a ratio of a number of photons in the waveband of 445-455 nm to a number of photons in the waveband of 431-441 nm is 1.18-1.54.

2. The bimodal blue light for promoting plant growth according to claim 1, wherein a peak wavelength in the waveband of 431-441 nm is 436 nm, and a peak wavelength in the waveband of 445-455 nm is 450 nm.

3. The bimodal blue light for promoting plant growth according to claim 1 or 2, wherein the number of the photons in the waveband of 431-441 nm accounts for 21-27% of a total number of photons in a waveband of 400-499 nm.

4. The bimodal blue light for promoting plant growth according to claim 1 or 2, wherein the number of the photons in the waveband of 445-455 nm accounts for 28-37% of a total number of photons in a waveband of 400-499 nm.

5. The bimodal blue light for promoting plant growth according to claim 1 or 2, wherein a number of photons in a waveband of 400-430 nm accounts for 13-24% of a total number of photons in a waveband of 400-499 nm.

6. The bimodal blue light for promoting plant growth according to claim 1 or 2, wherein a number of photons in a waveband of 442-444 nm accounts for 8-11% of a total number of photons in a waveband of 400-499 nm.

7. The bimodal blue light for promoting plant growth according to claim 1 or 2, wherein a number of photons in a waveband of 456-499 nm accounts for 1-2% of a total number of photons in a waveband of 400-499 nm.

8. A method of promoting plant growth, the method comprising:

irradiate a plant with the bimodal blue light of claim 1 or 2.

9. The method of promoting plant growth of claim 8, wherein a light intensity of the bimodal blue light is set as 150-800 pmol/m2–s, and a photoperiod is 8-15 h/d.

* * * * *